United States Patent
Oh et al.

(10) Patent No.: US 8,683,405 B2
(45) Date of Patent: Mar. 25, 2014

(54) MULTI-LAYER DISTRIBUTED NETWORK

(75) Inventors: Keong Hong Oh, Bayan Lepas (MY); Yee Liang Tan, Gelugor (MY); Siang Poh Lob, Kedah (MY); Chooi Pei Lim, Bayan Lepas (MY)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/418,958

(22) Filed: Mar. 13, 2012

(65) Prior Publication Data

US 2012/0169362 A1 Jul. 5, 2012

Related U.S. Application Data

(62) Division of application No. 12/253,910, filed on Oct. 17, 2008, now Pat. No. 8,166,429.

(51) Int. Cl.
*G06F 17/50* (2006.01)

(52) U.S. Cl.
USPC ........... 716/110; 716/101; 716/105; 716/114; 716/116; 716/136

(58) Field of Classification Search
USPC .......... 716/100–101, 105, 110, 114, 116, 136
See application file for complete search history.

(56) References Cited

U.S. PATENT DOCUMENTS

| | | | | |
|---|---|---|---|---|
| 6,532,544 | B1* | 3/2003 | Masleid et al. | 713/500 |
| 8,046,729 | B1* | 10/2011 | Fung et al. | 716/126 |
| 8,402,416 | B1* | 3/2013 | Fung et al. | 716/126 |
| 2006/0184906 | A1* | 8/2006 | Aizawa | 716/6 |
| 2009/0079488 | A1* | 3/2009 | Motoyoshi et al. | 327/297 |
| 2009/0210840 | A1* | 8/2009 | Berry et al. | 716/6 |
| 2009/0293035 | A1* | 11/2009 | Galbi et al. | 716/16 |

\* cited by examiner

*Primary Examiner* — Paul Dinh
(74) *Attorney, Agent, or Firm* — Womble Carlyle Sandridge & Rice LLP

(57) ABSTRACT

Apparatuses and processes for distributing signals in an integrated circuit are disclosed. An embodiment to use a custom layer together with a base layer on an integrated circuit for testing the integrated circuit includes having a structured network on the base layer. The custom layer connects the network to logic elements on the integrated circuit. The network may be evenly distributed across the base layer of the integrated circuit. Even distribution of the network may reduce skew of the test signals. Buffers are also placed along the structured network. The buffers may be placed to ensure a deterministic test signals distribution. Unused buffers in the base layer may be tied off to reduce current leakage.

16 Claims, 7 Drawing Sheets

MULTI-LAYER DISTRIBUTED NETWORK

PRIORITY

This application is a divisional application of U.S. application Ser. No. 12/253,910, filed Oct. 17, 2008 now U.S. Pat. No. 8,166,429. The disclosure of this related application is incorporated herein by reference for all purposes.

BACKGROUND

The present invention relates generally to a clock/buffer network in an integrated circuit device. More specifically, the invention relates to test signal routing in a device with a pre-built network in a non-customizable metal layer and an auto-routing network in a customizable metal layer.

Integrated circuit devices are used in a wide array of applications. To verify the quality of these devices, numerous tests can be carried out. Each device can be put through a rigorous industry standard test methodology to verify the quality of the device. Different test signals are typically controlled by different test pins and all these signals are routed to different parts of the integrated circuit to fully test the functionality of the circuit. As such, test signals need to be routed to different blocks in the integrated circuit to test the functionality of each logic block in an integrated circuit.

However, intensive test signal routing may cause congestion in the device, especially if the device is configured for a fairly complex application. Test signals generally come from test pins or I/O pins. As devices become smaller with more complex circuitry to support a wide variety of features, routing test signals in these devices has become more challenging. In other words, routing has become more complicated because the routing area has shrunk while the number of test signals has increased.

Furthermore, in some devices, test signal routing cannot be pre-determined because resource usage varies from design to design. It is difficult to build a fully independent routing track as each unique design will invariably need a different routing track. Therefore, high-fanout test signal routing needs to be built fully in the customizable layer of such devices, e.g., the place and route layer, as every unique design will require a different test signal routing track. However, this may cause routing congestion because these high-fanout test signals may use up routing tracks that can otherwise be used for routing other design signals.

Therefore, it is highly advantageous to have an apparatus and method that can alleviate routing congestion in a customizable layer without impacting the size of the die. It is also advantageous to have a pre-built network in a base layer that interconnects with logic elements in the customizable layer to ease the congestion in the place and route layer. It is further desirable to have a pre-built or pre-defined network with buffers placed at strategic locations in the base layer because such a network can provide a deterministic timing model.

SUMMARY

Embodiments of the present invention include apparatuses and processes for distributing signals in an integrated circuit. It should be appreciated that the present invention can be implemented in numerous ways, such as a process, an apparatus, or a device. Several inventive embodiments of the present invention are described below.

In one embodiment, an integrated circuit with two different layers is disclosed. The integrated circuit has a fixed layer with a network for device-wide distribution of test signals. In some embodiments, the network on the fixed layer has a predetermined structure. The integrated circuit also has a customizable layer that connects the network on the fixed layer to logic elements on the integrated circuit. The two layers are interconnected and the network on the first layer is used to route signals when testing the integrated circuit.

In another embodiment, a test network in an integrated circuit is described. The test network has a center network. The center network spreads across the integrated circuit and branches into each quadrant of the integrated circuit. Each of the quadrants has a quadrant network. The quadrant networks are identical or mirror image structures and are each connected to the center network. Test signals are transmitted from test pins on the integrated circuit through the center network to each of the quadrant networks.

In another aspect of the present invention, a process for preparing an integrated circuit is disclosed. A network is created in the process. The network may include a center network that branches into quadrants on the integrated circuit. The center network transmits test signals from test pins on the integrated circuit to each of the different quadrants. Each of the quadrants has a quadrant network that is connected to the center network. The quadrant networks receive the test signals transmitted through the center network. Buffers are placed along the network on the integrated circuit. Each of the buffers can be configured to route a signal from the network to an associated logic cell on the integrated circuit. The buffers are connected according to a design. In some embodiments, unused buffers are replaced with a tied off cell to reduce current leakage.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe integrated circuits and a process for distributing test signals in an integrated circuit. It will be obvious, however, to one skilled in the art, that the present invention may be practiced without some or all of these specific details. Also, some embodiments of the invention are described in the context of programmable logic devices, a type of integrated circuit, but the invention is not limited to programmable logic devices. Further, well-known operations have not been described in detail in order not to unnecessarily obscure the described embodiments of the present invention.

Embodiments described herein provide techniques for routing test signals in an integrated circuit without creating routing congestion in the circuit. Certain types of programmable devices, such as a mask-programmable logic device, have different metallization layers, some of which are customizable while others are non-customizable. Customizable layers or custom layers are metal layers on the device that can be configured to perform specific functions as required by a design whereas base layers are metal layers that cannot be configured, hence base layers are non-customizable layers or fixed layers. Embodiments of the current invention have a two-layer signal distribution network to efficiently route test signals without congesting the custom layer of an integrated circuit device. A structured test signal network is constructed in a non-customizable base layer of the device. The structure of this pre-defined test network allows test signals to be routed to different parts of the device and the structure of the network is independent from the design. Test signals can be routed anywhere across the device because the network is distributed across the device. Such a distributed test signal network maximizes test coverage on the device without congesting the custom layers. Embodiments of the current invention also free up place and route resources on the custom layer because test signals need not be routed on the custom layer and place and route tracks on the custom layer can be used for design signals.

Figure 1:
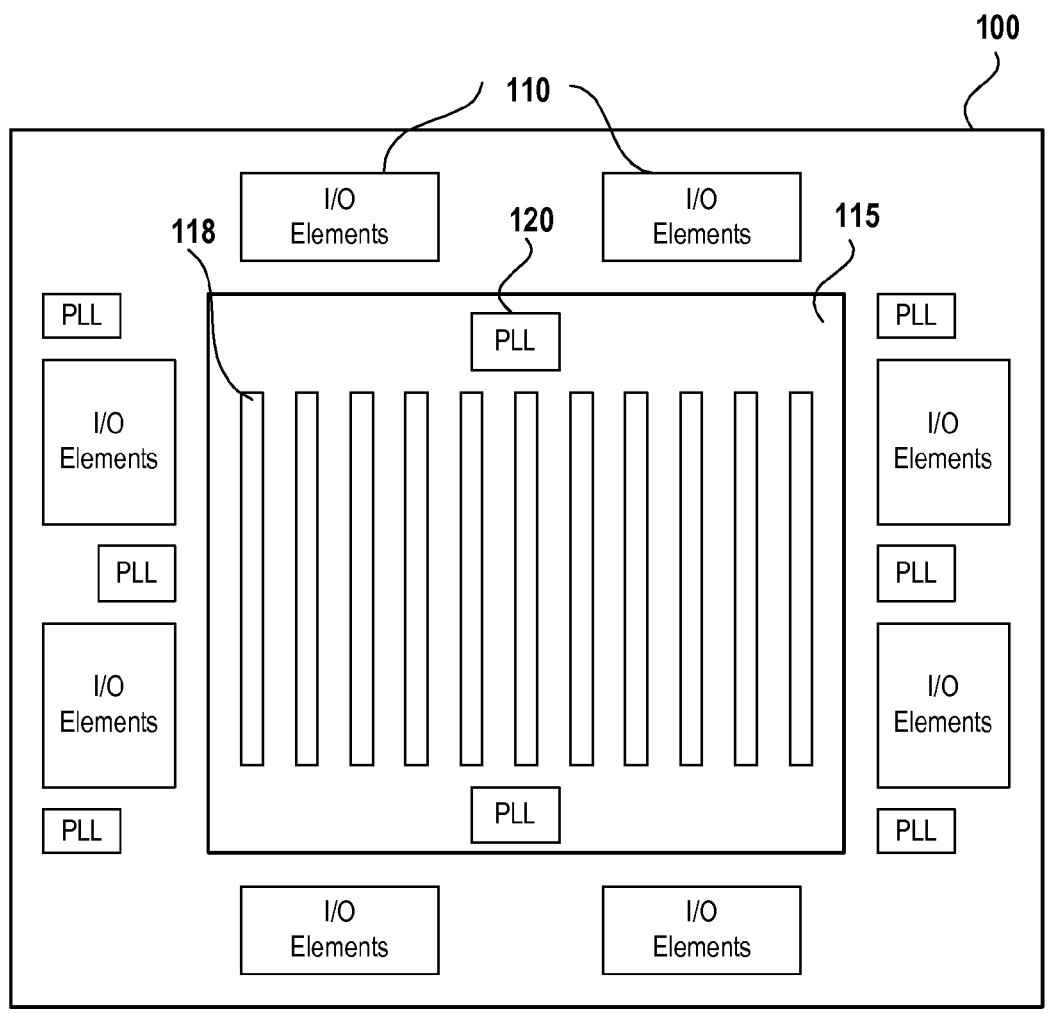
FIG. 1, meant to be illustrative and not limiting, shows a programmable device 100 in accordance with an embodiment of the present invention.

FIG. 1, meant to be illustrative and not limiting, shows a programmable device 100 in accordance with an embodiment of the present invention. The device 100 includes logic region 115. Input/output (I/O) elements 110 are preferably are located around the logic region 115 and a perimeter of the programmable device 100. Other auxiliary circuits such as phase-locked loops (PLLs) 120 for clock generation and timing, can be placed in between the I/O elements 110 and other unoccupied areas in logic region 115 as shown in FIG. 1. The logic region 115 may be filled with logic cells which include, among other things, at the most basic level, "logic elements" (LEs). LEs may include look-up table-based logic regions and these logic elements may be grouped into "Logic Array Blocks" (LABs). The logic elements and groups of logic elements or LABs can be configured to perform desired logical functions. In the embodiment shown, region 115 also includes a plurality of embedded memory blocks 118. Each of the memory blocks 118 may have a different size. For example, some of the memory blocks may be medium-embedded-memory (MEAB) blocks while others may be mega-RAM (MRAM) blocks.

Figure 1A:
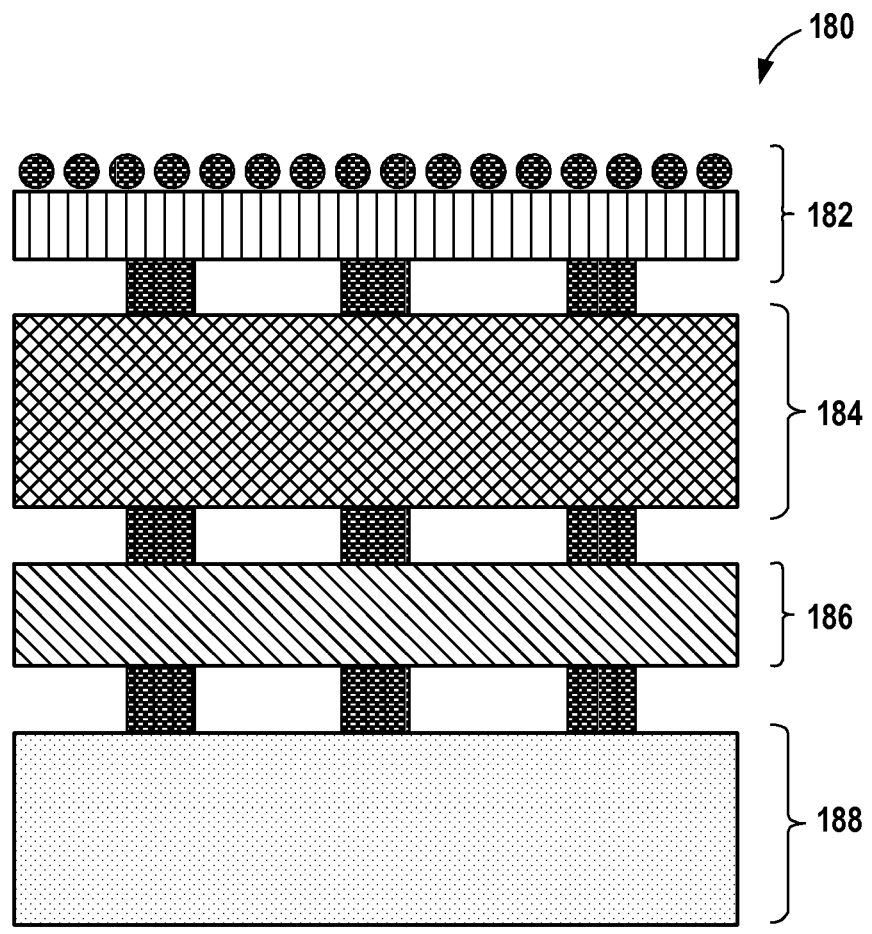
FIG. 1A, meant to be illustrative and not limiting, shows a cross section 180 of a programmable device and the different layers that the device may have in accordance with an embodiment of the present invention.

FIG. 1A, meant to be illustrative and not limiting, shows a cross section 180 of a programmable device and the different layers that the device may have in accordance with an embodiment of the present invention. A bump redistribution layer 182 with a plurality of bumps is shown. In one embodiment, the bump redistribution layer 182 is made of aluminum (Al) for better bump connections. Below the redistribution layer is a plurality of metal layers 184. In some embodiments, the metal layers 184 are used to create structured distribution networks for clocks and high-fanout signals in accordance with the present invention. In other embodiments, the metal layers 184 may also be used for power bussing. In a preferred embodiment, the metal layers 184 are non-customizable metal layers that cannot be re-programmed A plurality of custom layers 186 is shown below the metal layers 184. The custom layers 186 can be configured and programmed to perform desired functions. In certain embodiments, a place and route tool is used to form the connection from the distribution networks in the metal layers 184 to logic elements in the custom layers 186. A plurality of metal layers 188 is shown below the custom layers 186. The metal layers 188 are used for embedded memory blocks like MEABs and MRAMs. The metal layers 188 may also include logic cells, IO elements, and other auxiliary circuits like PLLs for clock generation and timing.

Figure 2:
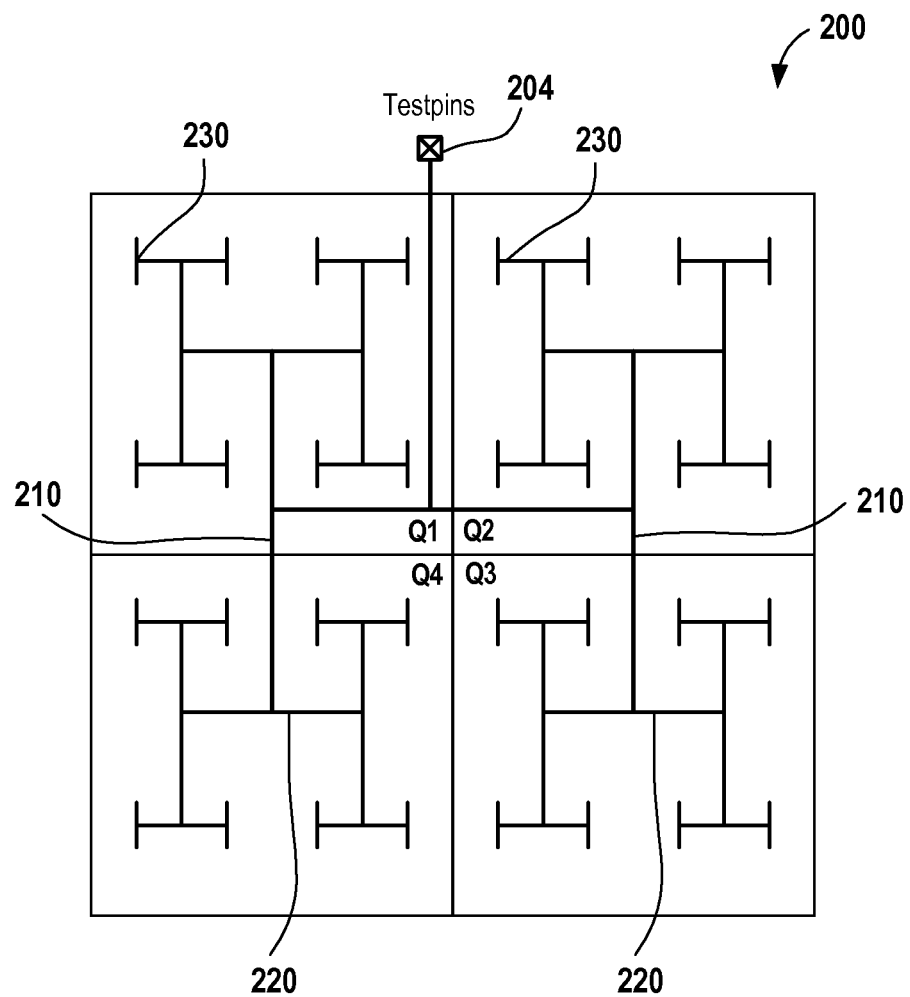
FIG. 2, meant to be illustrative and not limiting, shows a distributed test network on a layer 200 of an integrated circuit in accordance with an embodiment of the present invention.

FIG. 2, meant to be illustrative and not limiting, shows a distributed test network on a layer 200 of an integrated circuit in accordance with an embodiment of the present invention. In some embodiments, the layer 200 is a non-customizable metal layer on an integrated circuit device. However, one skilled in the art should appreciate that the test network can also be built on a customizable layer. The layer 200 is divided into quadrants. Test pins 204 receive test signals which are transmitted device wide via a center network 210. The center network spans across the layer 200 of the integrated circuit. In a preferred embodiment as shown in FIG. 2, the center network 210 is an H-tree structure that spans evenly across the base layer. Test signals are driven from the test pins 204 via the center network 210 to the center of the layer 200 of the integrated circuit before branching out into different quadrants.

Each quadrant has a quadrant network 220. In some embodiments, the quadrant networks 220 in each of the quadrants are identical or mirror image structures and connected to the center network 210. In one embodiment, each quadrant network 220 forms an H-tree structure in each of the quadrants. Test signals from the test pin 204 are transmitted from the center network 210 to each of the quadrants through the quadrant networks 220. Each of the quadrant networks 220 splits into a plurality of smaller networks 230 in each of the quadrants. In some embodiments, these smaller networks 230 are called spine networks and several of the smaller networks 230 are connected to a quadrant network 220. In one embodiment, each of the smaller networks 230 also forms an H-tree structure that is connected to each corner of the bigger H-tree structure of the quadrant network 220. In another embodiment, as shown in FIG. 2, there are at least four smaller networks 230 in each quadrant. In some embodiments, the network system on the layer 200—center, quadrant and spine networks—are constructed based on a test signal fanout requirement of a design. In one embodiment, the network system on the layer 200 is a dedicated distribution network for device-wide clocks built from basic logic cells.

Figure 2A:
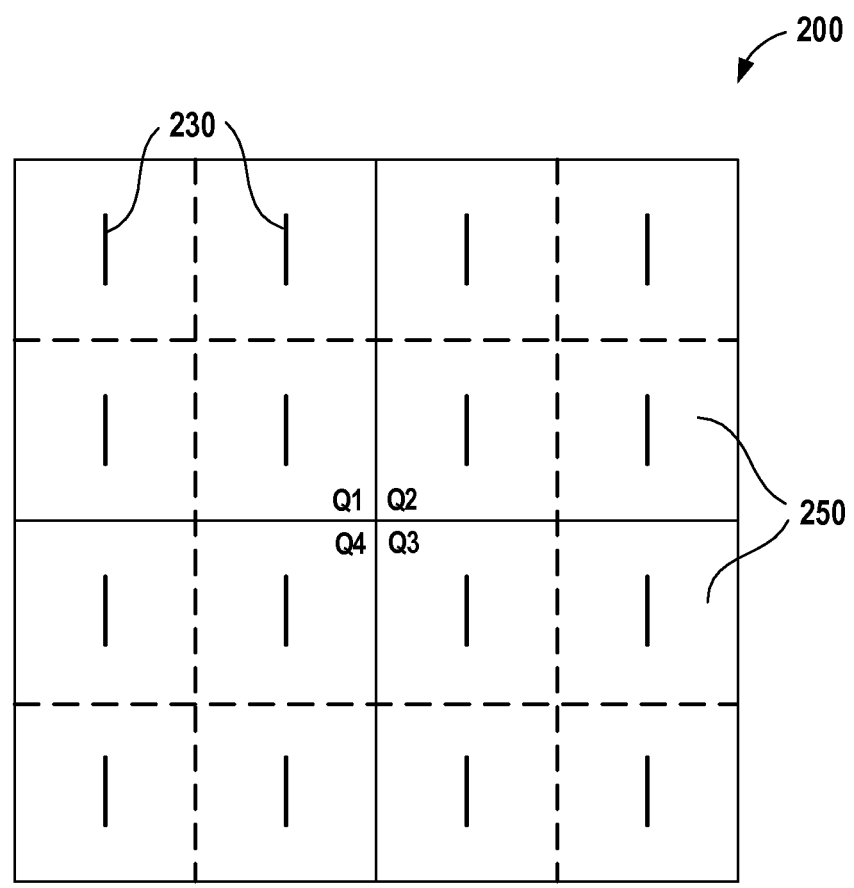
FIG. 2A, meant to be exemplary and not limiting, shows the layer 200 of an integrated circuit divided into quadrants where each of the quadrants is further divided into smaller quadrants 250 in accordance with an embodiment of the present invention.

FIG. 2A, meant to be exemplary and not limiting, shows the layer 200 of an integrated circuit divided into quadrants where each of the quadrants is further divided into smaller quadrants 250 in accordance with an embodiment of the present invention. Although only a few quadrants are shown, one skilled in the art should appreciate that the layer 200 can be further divided into smaller quadrants if desired. A spine network 230 as shown in FIG. 2 is distributed into each of the smaller quadrants. In one embodiment, the network 230 is evenly distributed across the layer 200, which ensures minimum skew in the test signals. In such an embodiment, each of the regions 250 is equal in size and there is an identical or mirror image network structure 230 in each region 250. In some embodiments, about 80% or more of the test signals are routed in the base layer 200, i.e. the fixed layer, to ease routing congestion in an upper layer. In other embodiments, a lower number of test signals are routed in the base layer as routing of test signals changes from design to design.

In one embodiment, the network is a predefined network without any actual connectivity to the logic elements on the integrated circuit. The network is connected to the logic elements through a custom layer. In some embodiments, a place and route tool is used to form the connection from the test network 200 to a design configured in the custom layer. In these embodiments, the custom layer is an upper metal layer that can be configured. In one embodiment, test signals will only be routed to used logic elements. This in turn may potentially reduce routing congestion in the custom layer.

Figure 3:
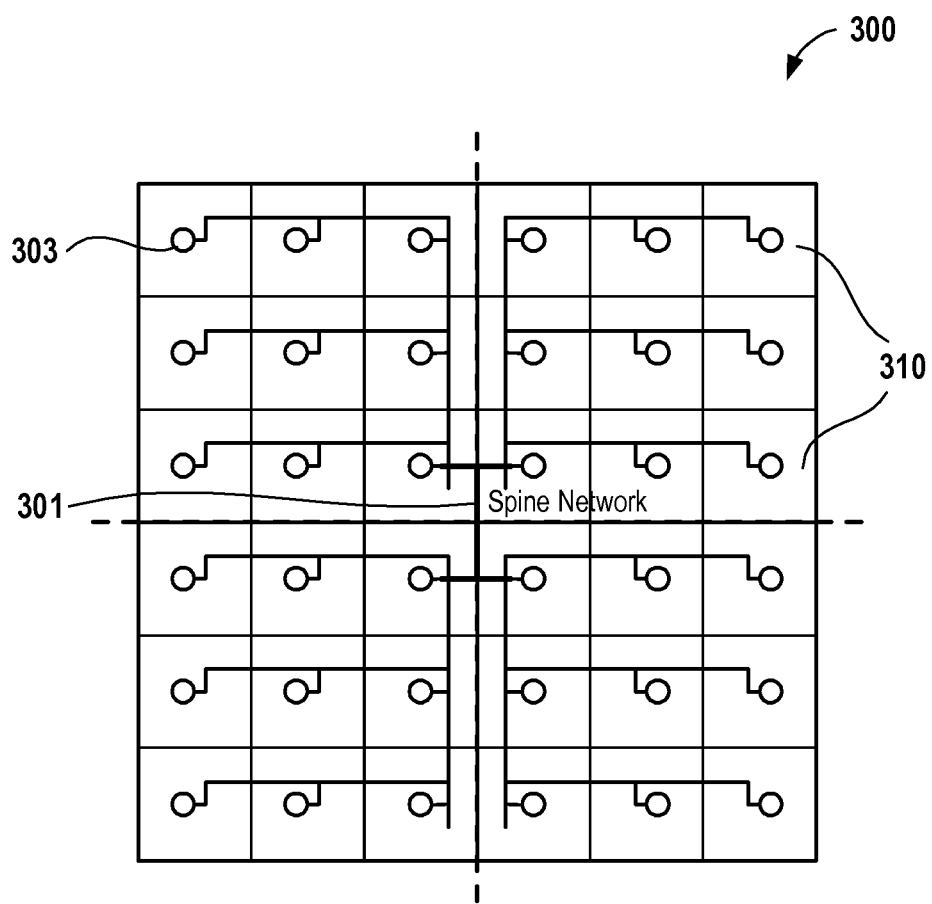
FIG. 3 shows how one spine network is further divided into a plurality of smaller quadrants in accordance with an embodiment of the present invention.

FIG. 3 shows how one spine network is further divided into a plurality of smaller quadrants in accordance with an embodiment of the present invention. In order to not obscure the present invention, only one spine network 301 is used to show how each of the individual networks 301 is further distributed in each quadrant. The spine network 301 is divided into equal quadrants. Buffers 303 are placed along the network 301. In some embodiments, these buffers 303 are pre-characterized to provide a deterministic distribution of test signals in the integrated circuit. Test signals are transmitted from the spine network 301 to each of the regions 310. In an exemplary embodiment, the regions 310 are core regions that may not be further divided into even smaller regions. In a preferred embodiment, each core region 310 area is approximately 400 μm×400 μm to ensure that the fanout test signals can be supported by each region 310. One skilled in the art should also appreciate that more core regions 310 and buffers 303 may be used even though only a few core regions 310 and a few buffers 303 are shown in FIG. 3.

Figure 4:
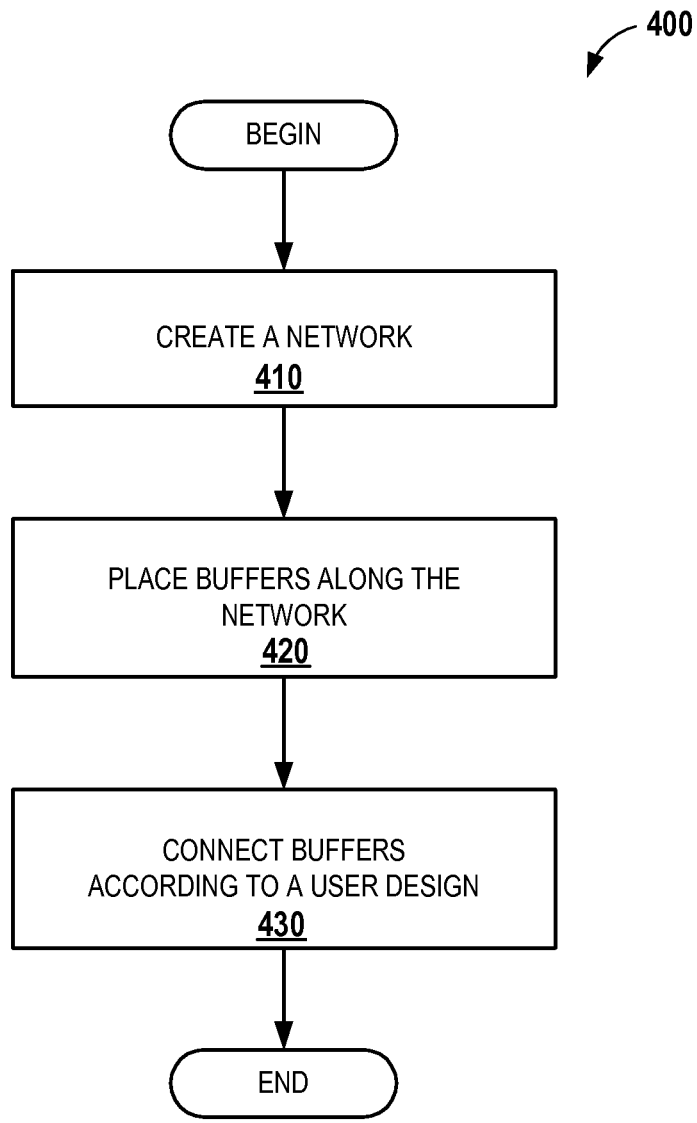
FIG. 4 shows process flow 400 for preparing a network in an integrated circuit in accordance with an embodiment of the present invention.
Figure 4A:
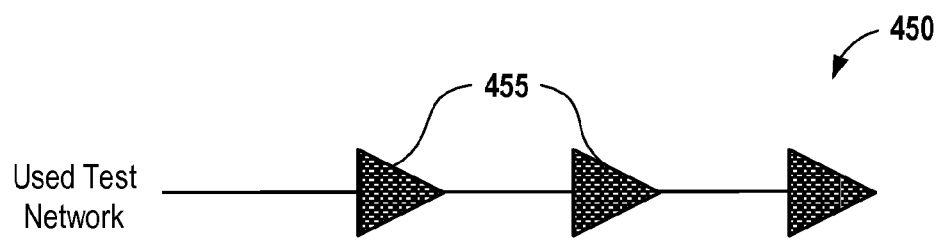
FIG. 4A is a simplified diagram showing an example of an exemplary test network 450 with buffers 455 that are used for routing test signals in a design in accordance with an embodiment of the present invention.
Figure 4B:
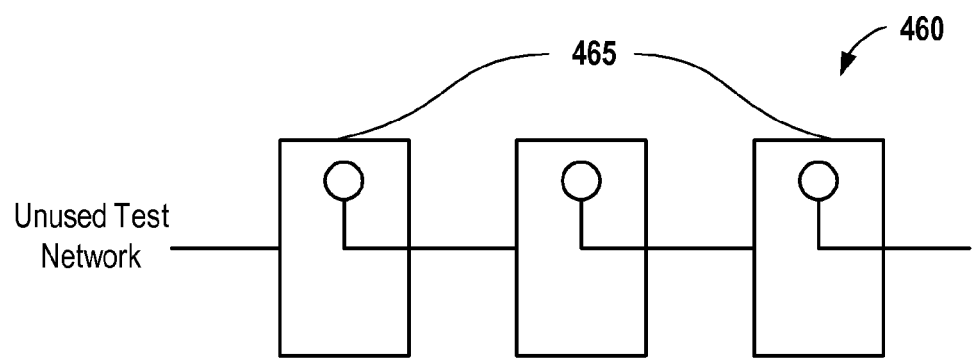
FIG. 4B, meant to be illustrative and not limiting, shows a simplified test network 460 where buffers 455 are replaced with tied off cells 465 and wherein a portion of the buffers are not used by the design in accordance with an embodiment of the present invention.

FIG. 4 shows process flow 400 for preparing a network in an integrated circuit in accordance with an embodiment of the present invention. In operation 410, a network is created. In a preferred embodiment, the network has a center network branching into a plurality of smaller quadrant networks. The center network transmits test signals from test pins to each of the quadrant networks. In an exemplary embodiment, the network is a structured network on a base layer 200 of the integrated circuit as described in FIG. 2. In operation 420, buffers are placed along the network in a predetermined manner. In some embodiments, the buffers are configurable to route signals from the network to associated logic cells. In operation 430, one or more of the buffers are connected to a power terminal. In certain embodiments, the buffers are connected according to a design. FIG. 4A is a simplified diagram showing an example of a used test network 450 with buffers 455 for routing test signals in accordance with an embodiment of the present invention. For certain designs that do not necessarily use all the buffers in the network, some of these buffers can be tied off. FIG. 4B, meant to be illustrative and not limiting, shows a simplified unused test network 460 where buffers 455 are replaced with tied off cells 465. In one embodiment, the tied off cells 465 drive an output port directly from an internal power rail to reduce current leakage that might arise from the additional buffers placed along the network. Therefore, in this embodiment, the test network can be converted into a power bus where unused buffers are replaced with tied off cells 465.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A test network in an integrated circuit, comprising:
a center network constructed in a non-customizable layer of the integrated circuit, wherein the center network branches into each quadrant of the integrated circuit;
a quadrant network in each of the quadrants, the quadrant networks constructed in the non-customizable layer of the integrated circuit, the quadrant networks having no connectivity to logic elements of the integrated circuit except through a custom layer of the integrated circuit, wherein the quadrant networks are substantially identical and are each connected to the center network and wherein test signals are transmitted from test pins on the integrated circuit through the center network to each of the quadrant networks for testing of the integrated circuit; and
pre-built buffers distributed along the test network, wherein the integrated circuit is divided into a plurality of core regions, and wherein each pre-built buffer is configurable as to routing a signal from the test network to a logic cell of a circuit design and as to tying off in a circuit design that does not use all of the pre-built buffers.

2. The test network of claim 1, wherein each of the quadrant networks forms an H-tree structure.

3. The test network of claim 1, wherein the center network forms an H-tree structure and wherein the test network is contained within a base layer of the integrated circuit.

4. The test network of claim 1, wherein:
the pre-built buffers distributed along the test network in an evenly spaced area of around 400 μm×400 μm across the integrated circuit.

5. The test network of claim 1, wherein the pre-built buffers can be detached from the test network when not used for testing the integrated circuit.

6. The test network of claim 1, wherein the test network functions as a clock network when not used for testing the integrated circuit.

7. The test network of claim 1, wherein the quadrant network in each of the quadrants is smaller in area than the center network.

8. The test network of claim 1, wherein each of the quadrants include at least 4 quadrant networks.

9. A test network in an integrated circuit, comprising:
a center network constructed in a non-customizable layer of the integrated circuit, wherein the center network branches into each quadrant of the integrated circuit;

a quadrant network in each of the quadrants, the quadrant networks constructed in the non-customizable layer of the integrated circuit, the quadrant networks lacking connectivity to logic elements of the integrated circuit except through a custom layer of the integrated circuit, wherein the quadrant networks are substantially identical and are each connected to the center network and wherein test signals are transmitted from test pins on the integrated circuit through the center network to each of the quadrant networks for testing of the integrated circuit; and a plurality of buffers distributed along the test network, wherein there is at least one buffer of the plurality of buffers in an evenly spaced area across the integrated circuit and wherein the plurality of buffers can be detached from the test network when not used for testing the integrated circuit.

10. The test network of claim 9, wherein each of the quadrant networks forms an H-tree structure.

11. The test network of claim 10, wherein the H-tree structure includes a spine network.

12. The test network of claim 9, wherein the center network forms an H-tree structure and wherein the test network is contained within a base layer of the integrated circuit.

13. The test network of claim 9 wherein the evenly spaced area is about 400 µm×400 µm across the integrated circuit.

14. The test network of claim 9, wherein the test network functions as a clock network when not used for testing the integrated circuit.

15. The test network of claim 9, wherein the quadrant network in each of the quadrants is smaller in area than the center network.

16. The test network of claim 9, wherein each of the quadrants include at least 4 quadrant networks.

* * * * *